US006372075B1

(12) United States Patent
Johnson

(10) Patent No.: US 6,372,075 B1
(45) Date of Patent: Apr. 16, 2002

(54) APPLIQUÈ AND METHOD OF APPLYING SAME TO A TRANSPARENT SUBSTRATE

(76) Inventor: Marilyn R. Johnson, 1029 6th La. N., Naples, FL (US) 34102

( * ) Notice: Subject to any disclaimer, the term of this patent is extended or adjusted under 35 U.S.C. 154(b) by 0 days.

(21) Appl. No.: 09/395,670

(22) Filed: Sep. 14, 1999

(51) Int. Cl.[7] .................................... B32B 31/04

(52) U.S. Cl. ...................... 156/247; 156/249; 156/297; 156/299

(58) Field of Search ............................ 156/247, 297, 156/299, 249; 428/914, 41.7, 41.8

(56) References Cited

U.S. PATENT DOCUMENTS

| | | | |
|---|---|---|---|
| 3,931,425 A | | 1/1976 | Kuroda |
| 4,009,309 A | | 2/1977 | Holt |
| 4,192,905 A | | 3/1980 | Scheibal |
| 4,302,260 A | | 11/1981 | Meltzer |
| 4,312,688 A | | 1/1982 | Brodis et al. |
| 4,318,946 A | | 3/1982 | Pavone |
| 4,342,611 A | | 8/1982 | Tuttle |
| 4,400,419 A | * | 8/1983 | Laczynski |
| 4,557,772 A | | 12/1985 | Crist, Jr. |
| 4,678,690 A | * | 7/1987 | Palmer et al. |
| 5,076,612 A | | 12/1991 | Nirmel |
| 5,240,287 A | | 8/1993 | Nirmel |
| 5,571,557 A | * | 11/1996 | De Bastiani et al. |
| 5,631,057 A | | 5/1997 | Sundet |
| 5,664,947 A | | 9/1997 | Dietterich et al. |
| 5,665,446 A | | 9/1997 | Sundet |
| 5,749,994 A | | 5/1998 | Sundet |
| 5,853,852 A | * | 12/1998 | Eichhorn |

FOREIGN PATENT DOCUMENTS

| | | | |
|---|---|---|---|
| FR | 2 287 716 | * | 6/1976 |

OTHER PUBLICATIONS

Author: Plaid Enterprises, Inc. Title of Publication: Etched Glass Rub–On Designs. Type of Publication: Pckaging for a consumer product. Place of Publication: Unknown. Number of Pages: 3.

Author: Unknown. Title of Publication: Better Homes and Gardens Title of Article: Privacy Windows, Wallpaper for Windows. p. 26. Date: Jul. 1999. Place of Publication: Unknown.

Author: Unknown. Title of Publication: Come Home. Title of Article: Foyers Fantastic. pp. 16–19. Date: Fall 1994. Place of Publication: Unknown. Publisher: Jay Libby; Meredith Publishing Services.

Author: Unknown. Title of Web Site: Stained Glass Vinyls. Address of Web Site: www.criss@big.net.au. Number of Pages: 3. Date: 1998. Place of Publication: Australia.

* cited by examiner

*Primary Examiner*—Curtis Mayes
(74) *Attorney, Agent, or Firm*—Liell & McNeil

(57) ABSTRACT

A method of applying appliqués to any or all sides of a transparent substrate comprises the steps of removably attaching a first pattern to a second side of a transparent substrate, where the first pattern corresponds to a first design. A first appliqué, which is the first design, is attached to a first side of the transparent substrate in alignment with the first pattern and the first pattern is removed. A second pattern, which corresponds to a second design, is removably attached to the first side of the transparent substrate in alignment with the first appliqué. A second appliqué, which is the second design, is attached to the second side of the transparent substrate in alignment with the second pattern and the second pattern is removed.

15 Claims, 6 Drawing Sheets

APPLIQUÈ AND METHOD OF APPLYING SAME TO A TRANSPARENT SUBSTRATE

TECHNICAL FIELD

The present invention relates generally to a method of applying appliqués, and more particularly to a method of applying appliqués to a transparent substrate to create a simulated beveled, leaded or etched appearance.

BACKGROUND ART

The beveled, leaded stain or etched effect can add flair to an otherwise plain glass or acrylic surface. Unfortunately, achieving these desired effects can be expensive as they must usually be added to the desired surface by a professional. This expense, combined with the popularity of these effects, has prompted people to search for methods of simulating these effects that can be carried out without the need of a professional's services. Several attempts have been made to create do-it-yourself kits to simulate the beveled, stained, leaded or etched effect. Previous kits usually included one or more designs that could be applied to the glass or acrylic surface to create a desired look. However, there is room for improving these kits and their method of use.

The present invention is directed to improving the method for applying appliqués to transparent substrates and to providing an inexpensive and uncomplicated method of applying those appliqués.

SUMMARY OF THE INVENTION

In one aspect of the present invention a method of applying appliqués to at least one side of a transparent substrate comprises the steps of removably attaching a first pattern to a second side of a transparent substrate, where the first pattern corresponds to a first design. A first appliqué, which is the first design, is attached to a first side of the transparent substrate in alignment with the first pattern and the first pattern is removed. A second pattern, which corresponds to a second design, is removably attached to one of the first side and the second side of the transparent substrate in alignment with the first appliqué. A second appliqué, which is the second design, is attached to the other of the first side and the second side of the transparent substrate in alignment with the second pattern, and then the second pattern is removed.

In another aspect of the present invention a method of applying an appliqué to a transparent substrate comprises the steps of removably attaching a first pattern to a second side of a transparent substrate, where the first pattern corresponds to a first design. A first appliqué is attached to a first side of the transparent substrate in alignment with a first pattern by sticking a first piece of hinging tape to both the transparent substrate and a first cover sheet which is affixed to the first appliqué. The first appliqué is the first design and is affixed to a first carrier sheet opposite the first cover sheet. The first piece of hinging tape is attached to the first cover sheet adjacent the first appliqué. The first appliqué is swung away from the transparent substrate and the first carrier sheet is removed. The first appliqué is then swung toward the transparent substrate and permanently attached to the transparent substrate. The first pattern is then removed from the transparent substrate.

In still another aspect of the present invention a repeating pattern appliqué assembly comprises a cover sheet which has a length and includes a first layer of non-aggressive adhesive. A plurality of identical appliqués is spaced in a pattern along, the length of the cover sheet. Each of the plurality of appliqués includes a first surface adjacent the first layer of the cover sheet and a second surface which includes a layer of aggressive adhesive. The second surface of each of the plurality of appliqués is in contact with a low adhesion carrier sheet. Each of the plurality of identical appliqués has an identical design.

BEST MODE FOR CARRYING OUT THE INVENTION

Figure 1:
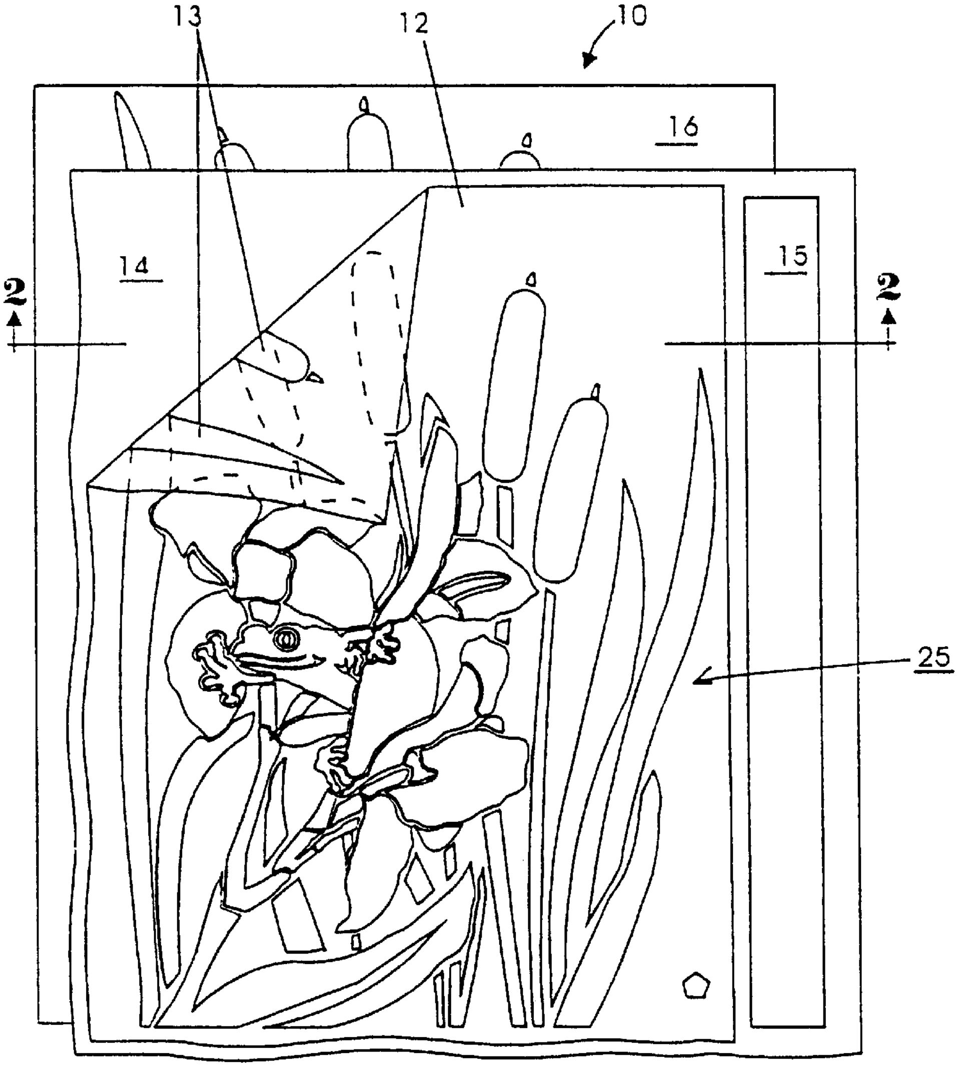
FIG. 1 is a front view of a first appliqué and a first pattern for use with the present invention.
Figure 2:
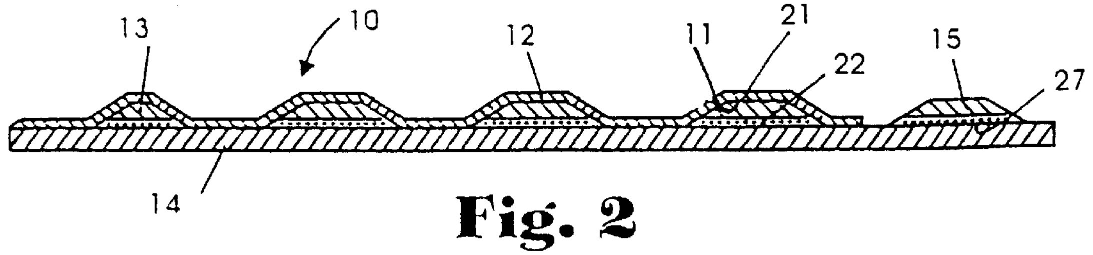
FIG. 2 is a sectioned view through the first appliqué of FIG. 1 through section lines 2—2.
Figure 3:
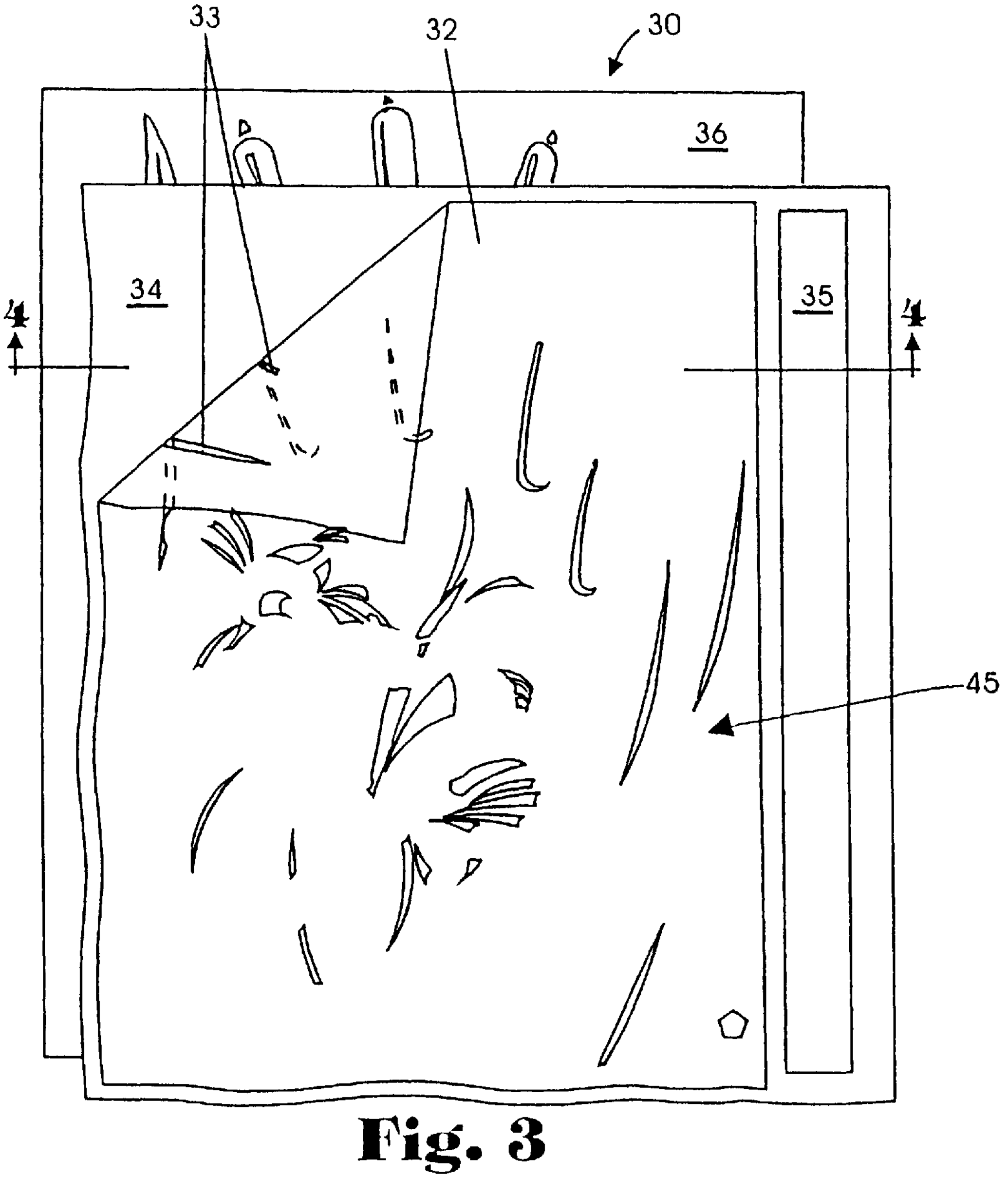
FIG. 3 is a front view of a second appliqué and a second pattern for use with the present invention.
Figure 4:
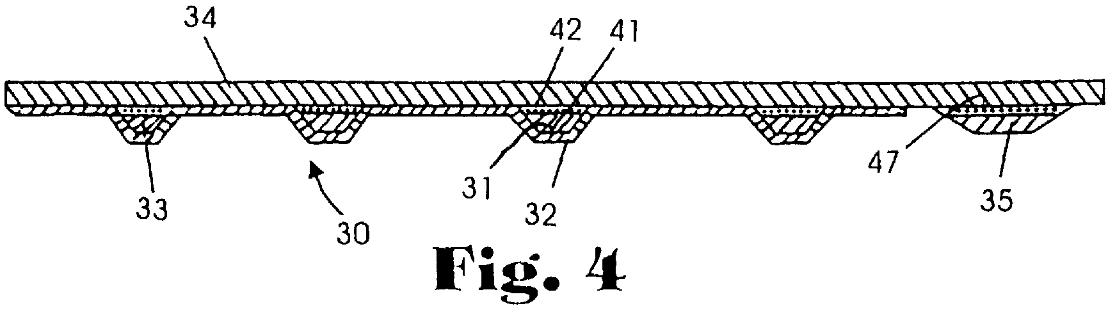
FIG. 4 is a sectioned view through the second appliqué of FIG. 3 through section lines 4—4.

Referring now to FIGS. 1–4 there is shown a first appliqué assembly 10 (FIGS. 1 and 2) and a second appliqué assembly 30 (FIGS. 3 and 4). First appliqué assembly 10 and second appliqué assembly 30 can be used with the method of the present invention to create a beveled, leaded, stain or etched effect on virtually any transparent substrate, including glass and acrylic surfaces. Alternatively, first appliqué assembly 10 and second appliqué assembly 30 can be used to add a combination of these looks to a transparent substrate.

First appliqué assembly 10 includes a first appliqué 13 which is comprised of a plurality of separate vinyl pieces. It should be appreciated that while the present invention employs appliqués made of a vinyl material, any suitable material could be substituted to achieve the same results. A variety of colors or qualities could be given to first appliqué

13 depending on the effect that is desired. For instance, if an etched effect is desired then first appliqué 13 and second appliqué 33 would preferably be composed of a plurality of separate translucent, gray pieces. However, if a stained glass effect is desired, the plurality of pieces that create first appliqué 13 would preferably be translucent and multi-colored while a plurality of pieces that create a second appliqué 33 (the simulated lead outline) would be opaque. First appliqué 13 includes a first surface 21 and a second surface 22. First appliqué assembly 10 is pre-assembled such that first surface 21 is adjacent a first cover sheet 12 and second surface 22, which is an aggressive adhesive, is adjacent a low adhesion first carrier sheet 14. Prior to application of first appliqué 13 to transparent substrate 17, first carrier sheet 14 prevents the adhesive on second surface 22 from coming into contact with other surfaces which could result in damage to first appliqué 13, such as loss of one or more separate pieces. Likewise, first cover sheet 12 protects first surface 21 from tearing or removal from first carrier sheet 14 prior to application. Both first carrier sheet 14 and first cover sheet 12 are translucent and first cover sheet 12 includes a non-aggressive adhesive layer 11 which is adjacent first surface 21. First cover sheet 12 aids in the transfer of first surface 21 and second surface 22 to transparent substrate 17.

A first pattern 16 is included in first appliqué assembly 10 which corresponds to a first design 25 created by first appliqué 13. Also included in first appliqué assembly 10 is a first piece of hinging tape 15 which is comprised of the same material as first appliqué 13 and includes a tape adhesive layer 27 which is composed of an aggressive adhesive. Hinging tape 15 is adjacent low adhesion first carrier sheet 14 and adjacent first appliqué 13 such that tape adhesive layer 27 is in contact with first carrier sheet 14. It should be appreciated that hinging tape 15 need not be transported in the manner shown, but could instead be included in an independent manner, such as on a separate roll. It should be further appreciated that hinging tape 15 could be made of a different material than first appliqué 13, and could in fact be substituted by a different adhesive material such as a pliable temporary mounting adhesive.

Second appliqué assembly 30 includes second appliqué 33 which is comprised of a plurality of pieces which can be composed of either the same material as first appliqué 13 or alternatively, a contrasting or dissimilar material. Second appliqué 33 includes a first surface 41 and a second surface 42. Second appliqué assembly 30 is pre-assembled in a like manner as first appliqué assembly 10 such that first surface 41 is adjacent a second cover sheet 32 and second surface 42, which includes an aggressive adhesive, is adjacent a low adhesion second carrier sheet 34. As with first appliqué assembly 10, second cover sheet 32 and second carrier sheet 34 protect second appliqué 33 from contact with undesired surfaces. Once again, second cover sheet 32 and second carrier sheet 34 are translucent and second cover sheet 32 includes a non-aggressive adhesive layer 31 which is adjacent first surface 41. A second pattern 36 is included in second appliqué assembly 30 which corresponds to a second design 45 created by second appliqué 33. Second pattern 36 also includes an outline of first design 25 which corresponds to first appliqué 13. Also included in second appliqué assembly 30 is a second piece of hinging tape 35 which includes a tape adhesive layer 47 composed of an aggressive adhesive. As with first piece of hinging tape 15, hinging tape 35 could be composed of the same material as either first appliqué 13 or second appliqué 33, or it could be a different material entirely. Also, as with first piece of hinging tape 15, hinging tape 35 need not be transported on second carrier sheet 34.

Figure 5:
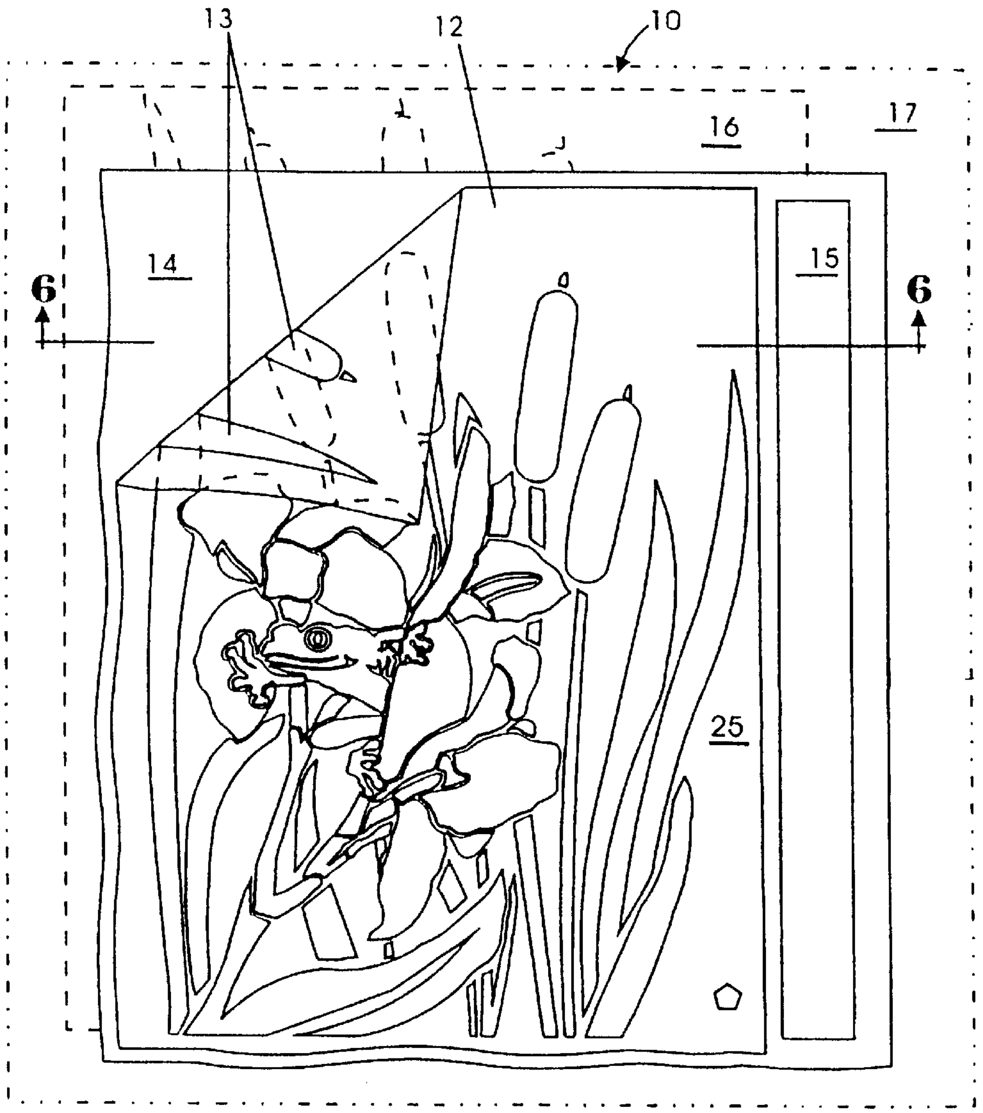
FIG. 5 is a front view of the application of the first appliqué of FIG. 1 on a transparent substrate according to the present invention.
Figure 6:
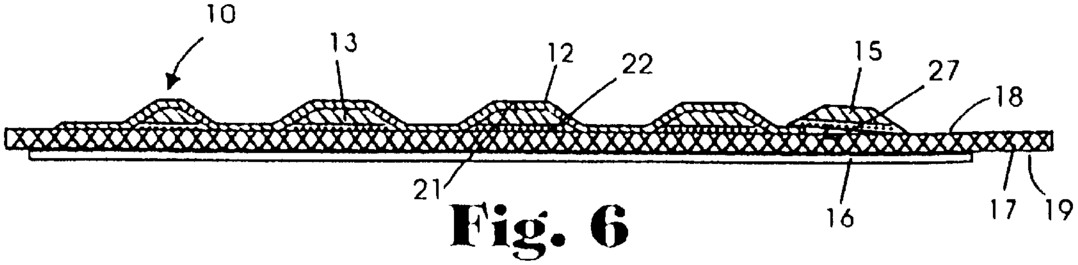
FIG. 6 is a sectioned view through the first appliqué, transparent substrate and first pattern of FIG. 5 through section lines 6—6, during application of the FIG. 5 appliqué.
Figure 7:
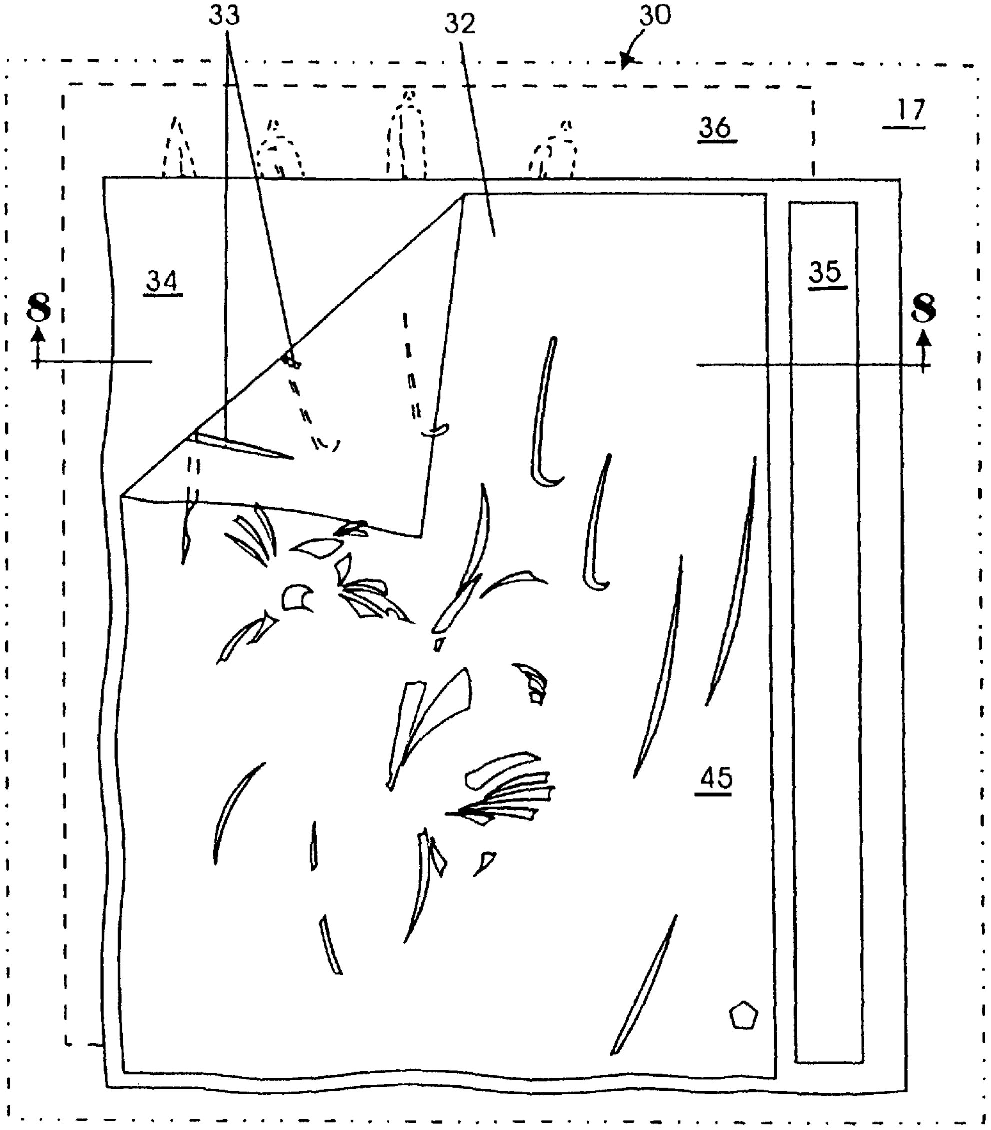
FIG. 7 is a front view of the application of the second appliqué of FIG. 3 on the transparent substrate of FIG. 5 according to the present invention.
Figure 8:
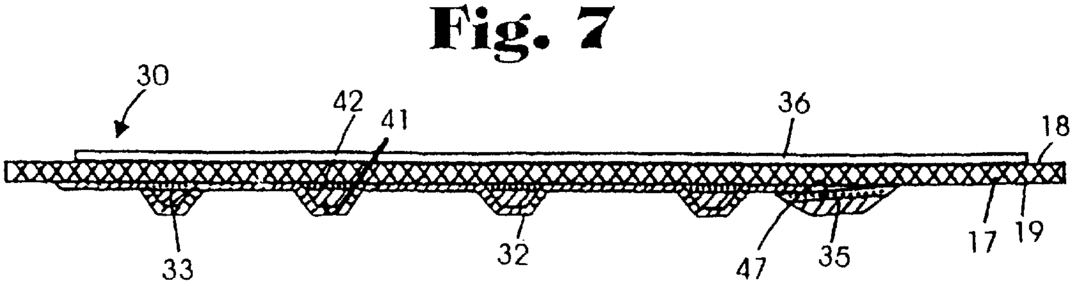
FIG. 8 is a sectioned view through the second appliqué, transparent substrate and second pattern of FIG. 7 through section lines 8—8, during application of the FIG. 7 appliqué.
Figure 9:
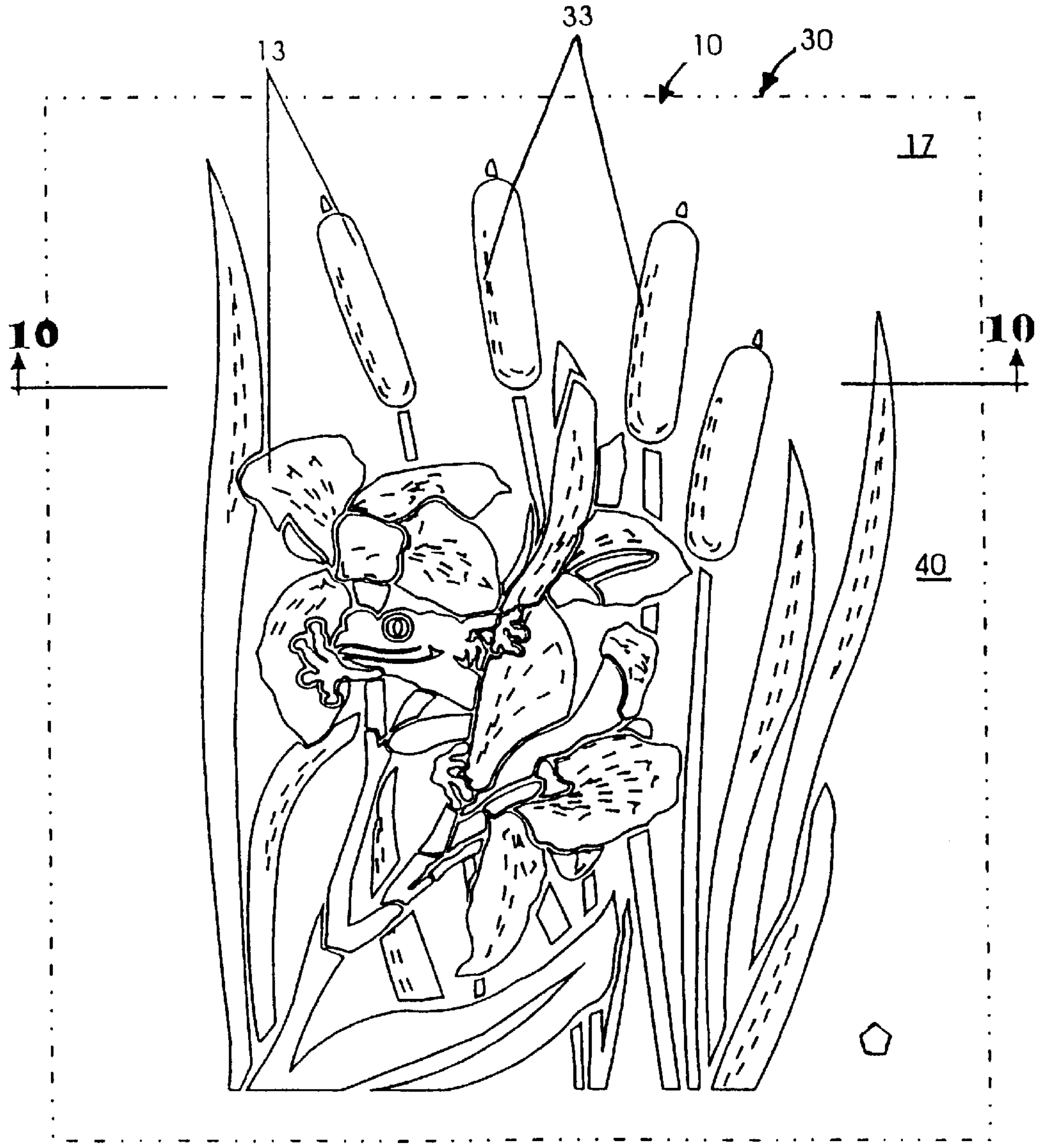
FIG. 9 is a front view of the transparent substrate after the application of the first appliqué of FIG. 1 and the second appliqué of FIG. 3 according to the present invention.
Figure 10:
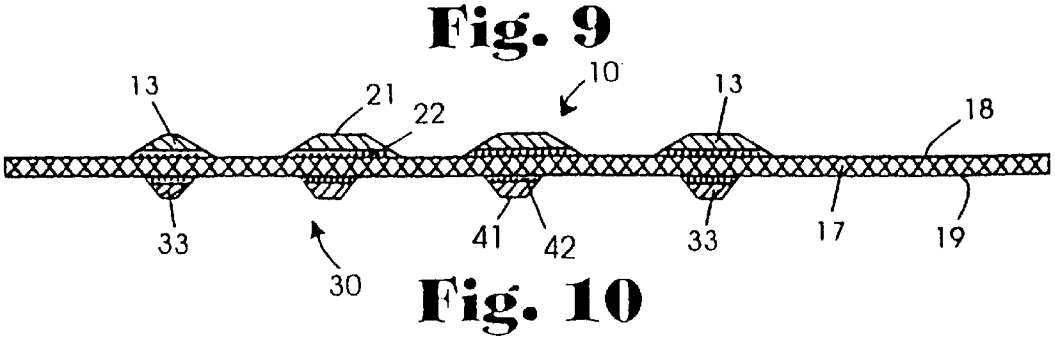
FIG. 10 is a sectioned view through the transparent substrate and appliqués of FIG. 9 through section lines 10—10.

Referring now to FIG. 5–8, there is illustrated the application of first appliqué 13 and second appliqué 33 to a transparent substrate 17, such as a window, according to the present invention. As shown in FIGS. 5–6, first appliqué 13 is aligned and affixed to a first side 18 of transparent substrate 17 in the manner described below and then, as shown in FIGS. 7–8, second appliqué 33 is similarly aligned and affixed to a second side 19 of transparent substrate 17. When applied together according to the present method, first appliqué 13 and second appliqué 33 combine to make a complete design 40 which can add the beveled, leaded, stain or etched effect, or a combination of these looks, to virtually any transparent substrate.

To apply first appliqué 13 to transparent substrate 17, first pattern 16 is removably attached to second side 19 such that first design 25 can be observed by someone looking through first side 18. First pattern 16 can be attached to second side 19 using any temporary adhesive, such as a tape similar to hinging tape 15, or any easily removable tape or temporary adhesive. Once first pattern 16 is secured to second side 19, first appliqué assembly 10 is aligned with first pattern 16. Alignment of first appliqué assembly 10 is performed by holding first appliqué assembly 10 against transparent substrate 17 such that first carrier sheet 14 is adjacent first side 18 and then viewing first pattern 16 through first cover sheet 12 and first carrier sheet 14. Recall that first cover sheet 12 and first carrier sheet 14 are translucent to better enable the user to view first pattern 16 through the three layers of material. However, it should be appreciated that first appliqué 13 could be translucent or opaque and not interfere with alignment with first pattern 16. Additionally, while first pattern 16 has been illustrated as creating an outline of first design 25, it should be appreciated that it could be a solid black representation of first design 25 on a white background to better enable viewing through all three layers of first appliqué assembly 10. First appliqué assembly 10 is positioned relative to first pattern 16 such that first appliqué 13 and first design 25 are in line and then first appliqué assembly 10 is attached to first side 18 by removing first piece of hinging tape 15 from first carrier sheet 14 and sticking it to both first side 18 and first cover sheet 12. When attached properly, it should be possible to swing first appliqué assembly 10 upward, vertically, away from first side 18 and to swing it downward toward first side 18 as if on a hinge, the hinge being first piece of hinging tape 15. Alternatively, the user might choose to apply the tape such that first appliqué assembly 10 could be swung to one side, horizontally, away from first side 18 and swung back toward that side in a similar hinging manner.

Once attached with first piece of hinging tape 15, first appliqué assembly 10 is swung upward, vertically, away from first side 18 and first carrier sheet 14 is peeled away from first appliqué 13 and first cover sheet 12. Now only two layers in thickness, the remaining portions of first appliqué assembly 10 are swung back toward transparent substrate 17 such that second surface 22 of first appliqué 13 is adjacent first side 18. As illustrated, the aggressive adhesive included on second surface 22 is pressure sensitive, however, it should be appreciated that any aggressive adhesive could be substituted. Alternatives could include, but are not limited to, a heat sensitive adhesive, or an adhesive that is applied to second surface 22 or first side 18 after first carrier sheet 14 is removed. First appliqué 13 is permanently affixed to first side 18 by applying pressure to first appliqué 13 through first cover sheet 12. Pressure is preferably applied by dragging a flexible tool, such as a plastic spatula, across first cover sheet 12. Hinging tape 15 is removed and first cover sheet 12 is peeled away leaving first appliqué 13 on first side 18. Removal of first pattern 16 completes the application of first appliqué 13, which is first design 25.

To apply second appliqué 33, second pattern 36 is removably attached to first side 18 of transparent substrate 17 in a manner similar to the attachment of first pattern 16. It should be noted that second pattern 36 not only corresponds to second design 45, but also may include an outline of first design 25 to help ensure proper alignment of second pattern 36 and subsequently, second appliqué 33. Additionally, second pattern 36 should be translucent to allow the user to more easily view first appliqué 13 when aligning second pattern 36. Second pattern 36 is aligned with first appliqué 13 and removably attached to first side 18. Second appliqué assembly 30 is aligned with second pattern 36 and first appliqué 13 by viewing second pattern 36 and first appliqué 13 through second cover sheet 32 and second carrier sheet 34. Again recall that second cover sheet 32 and second carrier sheet 34 are translucent to allow the user to more easily view second pattern 36 and first appliqué 13 through the three layers. Also, while the second appliqué 33 could be translucent, for instance to produce the etched effect, alignment would still be possible if it were opaque. After aligning second appliqué assembly 30 with second pattern 36 and first appliqué 13, second appliqué assembly 30 is attached to second side 19 by removing second piece of hinging tape 35 from second carrier sheet 34 and sticking it to both second side 19 and second cover sheet 32 in the hinging manner described in the application of first appliqué assembly 10.

Once attached with second piece of hinging tape 35, second appliqué assembly 30 is swung upward, vertically, away from second side 19 and second carrier sheet 34 is peeled away from second appliqué 33 and second cover sheet 32. Removal of second carrier sheet 34 will allow the aggressive adhesive on second surface 42 to be exposed to second side 19. The remaining two layers of second appliqué assembly 30 are swung back toward transparent substrate 17 such that second surface 42 of second appliqué 33 is adjacent second side 19. Second appliqué 33 is permanently affixed to second side 19 by applying pressure to second appliqué 33 through second cover sheet 32. Pressure is preferably applied by dragging a flexible tool, such as a plastic spatula, across second cover sheet 32. Hinging tape 35 is removed and second cover sheet 32 is peeled away leaving second appliqué 33 on second side 19. Removal of second pattern 36 completes the application of second appliqué 33. After second pattern 36 is removed, complete design 40, comprised of first design 25 and second design 45, is revealed.

FIGS. 1–10 illustrate one application of the present invention. As shown, first design 25 depicts, in etch effect, a frog surrounded by marsh grass. Second design 45 highlights features of both the frog and the surrounding grass to create a 3D effect that is further enhanced by two sided applications. However, it should be appreciated that several variations of the claimed method are possible. While first appliqué 13 and second appliqué 33 have both been contemplated to be translucent to create an etched effect, they could each have different qualities to create another effect. For example, first appliqué 13 could be composed of multiple pieces of varying shape and color and second appliqué 33 could be composed of opaque lead-look pieces. When applied in the manner of the present invention, first appliqué 13 and second appliqué 33 could combine to create a stained glass effect on transparent substrate 17.

Another modification of the present invention could include applying both first appliqué 13 and second appliqué 33 to first side 18. This would be preferable in instances where first appliqué 13 and second appliqué 33 need to abut each other to create the desire effect, usually to create certain beveled, leaded or stain effects. For this variation, first appliqué 13 would be applied to first side 18 in the manner described above. To apply second appliqué 33, second pattern 36 would be removably attached to second side 19, as was first pattern 16, and aligned with first design 25. Second appliqué 33 would then be applied as before, except the application would be to first side 18 thus allowing second appliqué 33 to abut, overlay or overlap first appliqué 13 if needed to achieve the desired look.

The method of the present invention could also be varied by including both first pattern 16 and second pattern 36 on a single pattern sheet. This single pattern sheet could be used in instances when first appliqué 13 and second appliqué 33 need to abut each other in order to create the desired effect, as well as those instances when first appliqué 13 and second appliqué 33 are being applied to opposite sides 18, 19 of transparent substrate 17. Application of first appliqué 13 and second appliqué 33 would be applied to transparent substrate 17 in one of the manners described above, with the exception that the same pattern sheet would be used for both first pattern 16 and second pattern 36.

The present method could also be modified to reduce the difficulty of applying sizable designs like one might apply to a large glass door or window. For example, first pattern 16 and second pattern 36 could represent a large design meant to cover a four foot square area. First appliqué 13 and second appliqué 33 could correspond to a one foot square portion of the design. For this variation, four sets of appliqués would be included. Each set comprised of one first design 25 and one second design 45, each to create a one foot square segment of the complete design. It should be appreciated that the segments could be any size which would make application more manageable. Application of each set of first and second appliqués would be performed in the manner of the present invention as previously illustrated, however, recalling that first pattern 16 and second pattern 36 would represent the complete design.

Figure 11:
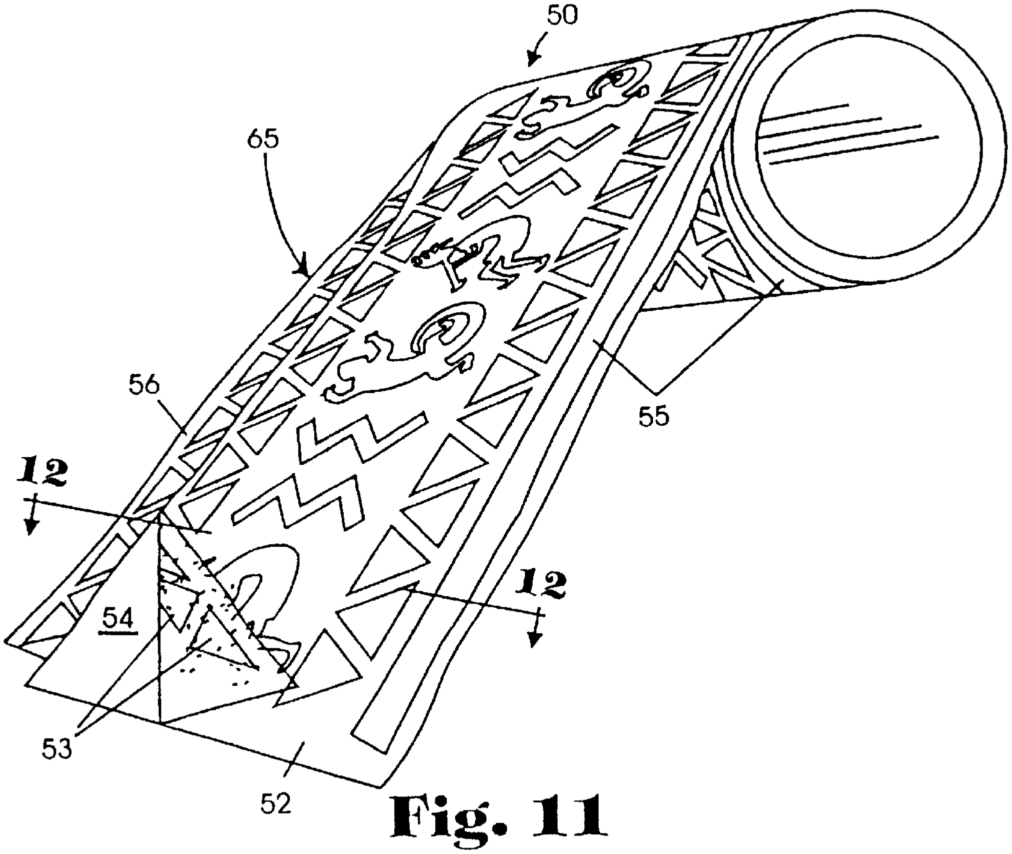
FIG. 11 is an isometric projection view of a repeating pattern appliqué and pattern according to the present invention.
Figure 12:
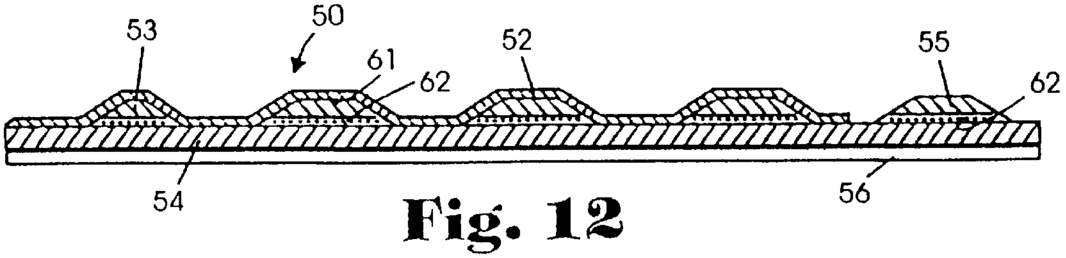
FIG. 12 is a sectioned view of the repeating pattern appliqué and pattern of FIG. 11 through section lines 12—12
Figure 13:
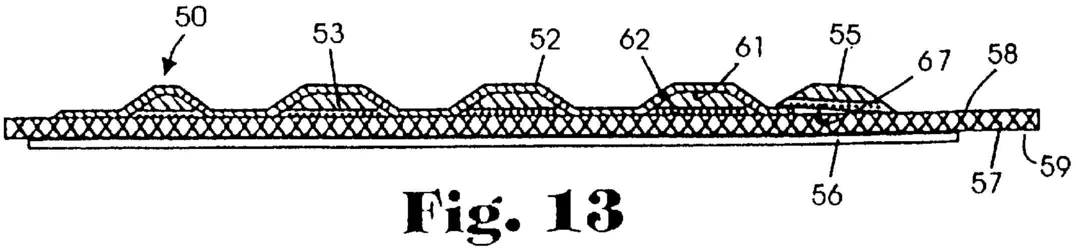
FIG. 13 is a sectioned view during the application of the repeating pattern appliqué of FIG. 12 according to the present invention.

Another variation on the current invention would include applying an appliqué that is comprised of a repeating pattern to one or both sides of a transparent substrate. This repeating pattern appliqué could be the only design applied to the transparent substrate, or could be used in conjunction with a first and second appliqué combination like that described previously. Referring now to FIGS. 11–13, a repeating pattern appliqué assembly 50, and the application of appliqué assembly 50, is shown. Repeating pattern appliqué assembly 50 includes a plurality of vinyl appliqués 53 which form a repeating pattern. As with first appliqué 13 and second appliqué 33, it should be appreciated that while the present invention employs appliqués made of a vinyl material, any suitable material could be substituted to achieve the same results. Plurality of appliqués 53 include a first surface 61 and a second surface 62. Repeating pattern appliqué assembly 50 is packaged such that first surface 61 is adjacent a cover sheet 52 and second surface 62, which includes an aggressive adhesive, is adjacent a low adhesion carrier sheet 54. Both cover sheet 52 and carrier sheet 54 are translucent and cover sheet 52 includes a non-aggressive adhesive layer which is adjacent first surface 61. A pattern 56 is included in repeating pattern appliqué assembly 50 which corresponds to a repeating design 65 created by plurality of appliqués 53. Also included in repeating pattern appliqué assembly 50 is a strip of hinging tape 55 which is comprised of the same material as plurality of appliqués 53 and includes a tape adhesive layer 67 which is composed of an aggressive adhesive. Hinging tape 55 is affixed to carrier sheet 54 adjacent appliqués 53 such that tape adhesive layer 67 is in contact with carrier sheet 54. Once again, hinging tape 55 need not be transported in the manner shown, but could instead be included separately. Likewise, hinging tape 55 could be made of a different material than appliqué 53, and could in fact be substituted by a different adhesive material such as a pliable temporary mounting adhesive.

Application of repeating pattern appliqués 53 is carried out in a manner similar to application of first appliqué 13. The user should first determine the length of the repeating design 65 desired and cut that desired length from repeating pattern appliqué assembly 50. Pattern 56 is then temporarily attached to a second side 59 of a transparent substrate 57 as described previously. Repeating pattern appliqué assembly 50 is aligned with pattern 56 and attached to a first side 58 of transparent substrate 57 with hinging tape 55 in the same fashion described for affixing first appliqué 13 to first side 18. Carrier sheet 54 is removed and pressure is applied to appliqués 53 through cover sheet 54 to permanently affix appliqués 53 to first side 58. Cover sheet 52 is pulled away from appliqués 53 and pattern 56 is removed revealing repeating design 65.

Still another variation on the current invention would include applying one or more appliqués to transparent substrate 17 and a second transparent substrate using the present method. When transparent substrate 17 and the second transparent substrate are placed one in front of the other, as in the case of an open sliding glass door for example, the appliqués on transparent substrate 17 and the second transparent substrate would combine to create a more detailed design with a three dimensional appearance.

It should be understood that the above description is intended for illustrative purposes only, and is not intended to limit the scope of the present invention in any way. For instance, while the present invention utilizes appliqués comprised of a vinyl material, it should be appreciated that any suitable material could be substituted. Additionally, the hinging tape illustrated for use with the present invention could be substituted by any temporary adhesive that would allow the user to swing the appliqué assemblies away from the transparent substrate to remove the carrier sheet. Further, it should be appreciated that the aggressive adhesive surface of the appliqués could be heat sensitive, or an adhesive that is added after removal of the carrier sheet rather than the pressure sensitive adhesive shown. Thus, those skilled in the art will appreciate that various modifications could be made to the disclosed embodiment without departing from the intended scope of the present invention, which is defined in terms of the claims set forth below.

What is claimed is:

1. A method of applying appliqués to at least one side of a transparent substrate comprising the steps of:

removably attaching a first pattern to a second side of a transparent substrate, said first pattern corresponding to a first design;

attaching a first appliqué to a first side of said transparent substrate in alignment with said first pattern, said first appliqué being said first design;

removing said first pattern;

removably attaching a second pattern to one of said first side and said second side of said transparent substrate in alignment with said first appliqué, said second pattern corresponding to a second design;

attaching a second appliqué to an other of said first side and said second side of said transparent substrate in alignment with said second pattern, said second appliqué being said second design; and removing said second pattern.

2. The method of applying appliqués of claim 1 wherein said first appliqué and said second appliqué each include a first surface adjacent a translucent cover sheet and a second surface adjacent a translucent low adhesion carrier sheet;

said step of attaching said first appliqué to said transparent substrate includes the steps of aligning said first appliqué with said first pattern and viewing said first pattern through said translucent cover sheet and said translucent carrier sheet; and said step of attaching said second appliqué to said transparent substrate includes the steps of aligning said second appliqué with said second pattern and viewing said second pattern through said translucent cover sheet and said translucent carrier sheet.

3. The method of applying appliqués of claim 1 further comprising the steps of attaching a third appliqué to a second transparent substrate; and positioning said first transparent substrate and said second transparent substrate one in front of the other.

4. The method of applying appliqués of claim 1 wherein said first appliqué and said second appliqué are each affixed to respective translucent cover sheets; and said steps of attaching said first appliqué and said second appliqué include removably attaching said cover sheets to said transparent substrate, aligning said first appliqué and said second appliqué with said first and second patterns, and removing said cover sheets.

5. The method of applying appliqués of claim 4 wherein said first appliqué and said second appliqué are each affixed to respective translucent low adhesion carrier sheets;

said step of removably attaching a first of said cover sheets to said transparent substrate includes removing a first piece of hinging tape from a first of said low adhesion carrier sheets and sticking said first translucent cover sheet to said transparent substrate using said first piece of hinging tape; and said step of removably attaching a second of said cover sheets to said transparent substrate includes removing a second piece of hinging tape from a second of said low adhesion carrier sheets and sticking said second translucent cover sheet to said transparent substrate using said second piece of hinging tape.

6. The method of applying appliqués of claim 1 wherein said first design and said second design combine into a complete design; and said step of aligning said second pattern with said first appliqué includes positioning a portion of said second appliqué relative to said first appliqué.

7. The method of applying appliqués of claim 4 wherein said step of removably attaching said second pattern includes removably attaching said second pattern to said first side of said transparent substrate; and said step of attaching said second appliqué to said transparent substrate includes attaching said second appliqué to said second side of said transparent substrate.

8. The method of applying appliqués of claim 1 wherein said first appliqué and said second appliqué are translucent;

said first appliqué and said second appliqué each include a first surface adjacent a translucent cover sheet and a second surface adjacent a translucent low adhesion carrier sheet;

said step of attaching said first appliqué to said transparent substrate includes the steps of aligning said first appliqué with said first pattern and viewing said first pattern through said translucent cover sheet, said translucent first appliqué and said translucent carrier sheet; and said step of attaching said second appliqué to said transparent substrate includes the steps of aligning said second appliqué with said second pattern and viewing said second pattern through said translucent cover sheet, said translucent second appliqué and said translucent carrier sheet.

9. The method of applying appliqués of claim 8 wherein said second pattern is translucent; and said step of removably attaching said second pattern to said transparent substrate includes viewing said first appliqué through said second pattern and aligning said second pattern with said first appliqué.

10. A method of applying an appliqué to a transparent substrate comprising the steps of:

removably attaching a first pattern to a second side of a transparent substrate, said first pattern corresponding to a first design;

attaching a first appliqué to a first side of said transparent substrate in alignment with said first pattern by sticking a first piece of hinging tape to both said transparent substrate and a first cover sheet affixed to said first appliqué;

said first appliqué being said first design and being affixed to a first carrier sheet opposite said first cover sheet;

said first piece of hinging tape being attached to said first cover sheet adjacent said first appliqué;

swinging said first appliqué away from said transparent substrate and removing said first carrier sheet;

swinging said first appliqué toward said transparent substrate and permanently attaching said first appliqué to said transparent substrate; and removing said first pattern from said transparent substrate.

11. The method of applying an appliqué of claim 10 wherein said step of swinging said first appliqué toward said transparent substrate includes the step of exposing an adhesive layer of said first appliqué to said transparent substrate.

12. The method of applying an appliqué of claim 11 wherein said first cover sheet is translucent;

said first carrier sheet is translucent; and said step of attaching said first appliqué to said transparent substrate includes aligning said first appliqué with said first pattern and viewing said first pattern through said first translucent cover sheet and said translucent carrier sheet.

13. The method of applying an appliqué of claim 12 further comprising the steps of removably attaching a second pattern to said first side of said transparent substrate in alignment with said first appliqué and said second pattern corresponding to a second design;

attaching a second appliqué to said second side of said transparent substrate in alignment with said second pattern by sticking a second piece of hinging tape to both said transparent substrate and a second cover sheet affixed to said second appliqué;

said second appliqué being said second design and being affixed to a second carrier sheet opposite said second cover sheet;

said second piece of hinging tape being attached to said second carrier sheet adjacent said second appliqué;

swinging said second appliqué away from said transparent substrate and removing said second carrier sheet;

swinging said second appliqué toward said transparent substrate and permanently attaching said second appliqué to said transparent substrate; and removing said second pattern.

14. The method of applying an appliqué of claim 13 wherein said first design and said second design combine to make a complete design; and said step of aligning said second pattern with said first appliqué includes aligning said portion of said first design with said first appliqué.

15. The method of applying an appliqué of claim 14 wherein said second pattern is translucent;

said first pattern and said second pattern are included on a single pattern sheet;

said step of attaching said second appliqué includes placing said second appliqué in alignment with a portion of said first appliqué; and said step of attaching said second pattern to said transparent substrate includes viewing said first appliqué through said second pattern and aligning said second pattern with said first appliqué.

* * * * *